United States Patent
Chen et al.

(10) Patent No.: US 11,881,052 B2
(45) Date of Patent: Jan. 23, 2024

(54) FACE SEARCH METHOD AND APPARATUS

(71) Applicant: HUAWEI TECHNOLOGIES CO., LTD., Guangdong (CN)

(72) Inventors: Kai Chen, Hangzhou (CN); Wenhong Gong, Hangzhou (CN); Haoquan Shen, Moscow (RU); Mingxue Wang, Ottawa (CA); Changcai Lai, Shenzhen (CN); Xiangyu Hu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 26 days.

(21) Appl. No.: 17/671,253

(22) Filed: Feb. 14, 2022

(65) Prior Publication Data

US 2022/0165091 A1  May 26, 2022

Related U.S. Application Data

(63) Continuation of application No. PCT/CN2020/100547, filed on Jul. 7, 2020.

(30) Foreign Application Priority Data

Aug. 15, 2019 (CN) .......................... 201910755045.2
Nov. 8, 2019 (CN) .......................... 201911089829.2

(51) Int. Cl.
*G06V 40/16* (2022.01)
*G06V 10/80* (2022.01)
(Continued)

(52) U.S. Cl.
CPC .......... *G06V 40/172* (2022.01); *G06V 10/761* (2022.01); *G06V 10/774* (2022.01);
(Continued)

(58) Field of Classification Search
CPC ............... G06V 40/172; G06V 10/761; G06V 10/7715; G06V 10/774; G06V 10/806;
(Continued)

(56) References Cited

U.S. PATENT DOCUMENTS

| | | | |
|---|---|---|---|
| 11,380,010 B2 * | 7/2022 | Rampal | G06V 20/10 |
| 2007/0172099 A1 * | 7/2007 | Park | G06V 40/172 |
| | | | 382/218 |

(Continued)

FOREIGN PATENT DOCUMENTS

| | | |
|---|---|---|
| CN | 101526997 A | 9/2009 |
| CN | 103824052 A | 5/2014 |

(Continued)

OTHER PUBLICATIONS

Jie Hu et al., Towards Visual Feature Translation, arXiv:1812.00573v2 [cs.CV] Mar. 29, 2019, 10 pages.

(Continued)

*Primary Examiner* — Md K Talukder
(74) *Attorney, Agent, or Firm* — James Harrison

(57) ABSTRACT

A face search method and apparatus are provided. The method includes obtaining a to-be-searched face image, and inputting the face image into a first feature extraction model to obtain a first face feature. The method further includes inputting the face image and the first face feature into a first feature mapping model for feature mapping, to output a standard feature corresponding to the first face feature, and performing face search for the face image based on the standard feature. Features extracted by using a plurality of feature extraction models are concatenated, and a concatenated feature is used as a basis for constructing a standard feature.

17 Claims, 9 Drawing Sheets

(51) Int. Cl.
 *G06V 10/77* (2022.01)
 *G06V 10/74* (2022.01)
 *G06V 10/774* (2022.01)
 *G06V 10/82* (2022.01)

(52) U.S. Cl.
 CPC ........ *G06V 10/7715* (2022.01); *G06V 10/806* (2022.01); *G06V 40/168* (2022.01); *G06V 10/82* (2022.01)

(58) Field of Classification Search
 CPC ...... G06V 40/168; G06V 10/82; G06N 3/045; G06N 3/084; G06F 16/583
 See application file for complete search history.

(56) References Cited

U.S. PATENT DOCUMENTS

| | | | | |
|---|---|---|---|---|
| 2008/0166026 | A1* | 7/2008 | Huang | G06V 40/171 382/118 |
| 2010/0254594 | A1* | 10/2010 | Wang | G06T 11/00 382/203 |
| 2013/0121590 | A1* | 5/2013 | Yamanaka | G06V 10/758 382/195 |
| 2014/0093142 | A1 | 4/2014 | Hayasaka et al. | |
| 2014/0140583 | A1* | 5/2014 | Yano | G06V 10/758 382/118 |
| 2015/0098632 | A1* | 4/2015 | Monta | G06V 40/173 382/118 |
| 2019/0095745 | A1* | 3/2019 | Bao | G06T 7/246 |
| 2019/0102528 | A1 | 4/2019 | Beacham et al. | |
| 2022/0138472 | A1* | 5/2022 | Mittal | G06N 3/045 382/181 |
| 2022/0165091 | A1* | 5/2022 | Chen | G06F 16/583 |

FOREIGN PATENT DOCUMENTS

| | | |
|---|---|---|
| CN | 106503669 A | 3/2017 |
| CN | 108537120 A | 9/2018 |
| CN | 108537143 A | 9/2018 |
| CN | 108921100 A | 11/2018 |
| WO | 2019119505 A1 | 6/2019 |

OTHER PUBLICATIONS

Ken Chen et al., R3 Adversarial Network for Cross Model Face Recognition, 2019, 9 pages.

* cited by examiner

FACE SEARCH METHOD AND APPARATUS

CROSS-REFERENCE TO RELATED APPLICATIONS

This application is a continuation of International Application No. PCT/CN2020/100547, filed on Jul. 7, 2020, which claims priority to Chinese Patent Application No. 201910755045.2, filed on Aug. 15, 2019 and Chinese Patent Application No. 201911089829.2, filed on Nov. 8, 2019. All of the aforementioned patent applications are hereby incorporated by reference in their entireties.

TECHNICAL FIELD

This application relates to the field of artificial intelligence and computer vision, and in particular, to a face search method and apparatus.

BACKGROUND

With the development of science and technology, face search is a new biometric recognition technology that integrates knowledge of computer image processing and knowledge of biostatistics. Currently, face search is widely used in scenarios such as identity recognition and identity authentication (for example, security surveillance and access control gates).

In a face search technology, a to-be-searched face image is usually given, and a face search system compares the to-be-searched face image with a plurality of face images in a specified face library to find one or more face images most similar to the to-be-searched face image. The face search system does not directly calculate similarities between the to-be-searched face image and the face images in the face library, but represents all the images as features and calculates the similarities between the to-be-searched face image and the face images in the face library by using these features, to find one or more face images most similar to the to-be-searched face image. Different face features can be usually extracted from different feature extraction models, but face features from different feature extraction models cannot be directly compared. The face features extracted from all of the feature extraction models need to be mapped to a same feature space, and feature comparison is performed in the feature space, to ensure that the face features from the different feature extraction models can be directly compared. In this case, which feature space is selected for feature mapping becomes a problem. In addition, because all of the different face features are finally mapped to the same feature space, how to comprehensively apply a plurality of feature extraction models is also a problem.

SUMMARY

This application provides a face search method and apparatus, to select an appropriate feature space by comprehensively applying a plurality of feature extraction models to improve face search accuracy.

According to a first aspect, this application provides a face search method. The method may be applied to related scenarios such as identity recognition and identity authentication. The face search method may include: obtaining a to-be-searched face image, where the to-be-searched face image may be an image shot by a camera or an image manually uploaded by a user; performing feature extraction on the face image by using a first feature extraction model, to obtain a first face feature; inputting the face image and the first face feature into a first feature mapping model to output a standard feature corresponding to the first face feature, where the first feature mapping model is obtained through training based on a target feature corresponding to a face sample image, and a feature output dimension quantity of the first feature extraction model is the same as a feature input dimension quantity of the first feature mapping model; and performing face search for the face image based on the standard feature.

In this application, first face features in the face image may be classified into structured features and unstructured features. The structured features may include features used to represent face attributes. The face attributes may refer to some specific physical meanings of the face image, for example, age, gender, and/or angle, and are extracted from the face image by using a structured feature extraction model. The unstructured features may include a vector used to represent face features. The face features may be features in the face image that have no specific physical meaning, and include a string of digits. The face features may also be referred to as feature vectors, and are extracted from the face image by using an unstructured feature extraction model. A similarity between the feature vectors may be used to represent a similarity between a to-be-searched face image and a face template image.

In this application, a face feature and a face image are both used as inputs to a feature mapping model. When it is difficult to obtain an appropriate standard feature by using only the face feature, a more appropriate standard feature is obtained by using additional information provided by the face image. This improves face search accuracy.

In this application, features extracted by using a plurality of feature extraction models are concatenated, and a concatenated feature is used as a basis for constructing a standard feature. In this case, a face search system can select an appropriate feature space by comprehensively applying the plurality of feature extraction models. This improves face search accuracy. Further, because a standard feature needs to be obtained from each face image by using only one feature extraction model and one feature mapping model, a calculation amount of a system does not exponentially increase with a quantity of models. This reduces a calculation amount of the system. Further, feature mapping models one-to-one correspond to feature extraction models, and a quantity of feature mapping models is consistent with a quantity of feature extraction models. Therefore, the face search system does not need to train a large quantity of feature mapping models. This reduces a calculation amount of the system.

According to the first aspect, in some possible implementations, the target feature corresponding to the face sample image is obtained by concatenating a plurality of face sample features, and the face sample features are obtained by performing feature extraction on the face sample image by using a plurality of second feature extraction models. The plurality of second feature extraction models include the first feature extraction model. The plurality of second feature extraction models have at least different training samples, different model structures, different training policies, or different feature dimension quantities.

In this application, the plurality of second feature extraction models may be second feature extraction models of a manufacturer or second feature extraction models of other different manufacturers. The plurality of second feature extraction models may include the first feature extraction model, that is, the second feature extraction models may include another feature extraction model in addition to the first feature extraction model. The plurality of second feature extraction models have different training samples, different model structures, different training policies, or different feature dimension quantities.

According to the first aspect, in some possible implementations, the method further includes: obtaining the face sample image; inputting the face sample image into the first feature extraction model to output a first face sample feature; and training a second feature mapping model based on the face sample image, the first face sample feature, and the target feature corresponding to the face sample image, to obtain the first feature mapping model, where the second feature mapping model corresponds to the first feature extraction model.

In this application, the second feature mapping model may be a feature mapping model obtained by a manufacturer through sample training, or a feature mapping model obtained through cooperative training between the manufacturer and another manufacturer. Specifically, inputs to the second feature mapping model are a face image and the first face feature, an output of the second feature mapping model is a standard feature, and an optimization objective of training is fitting the standard feature to the target feature as much as possible. The target feature is obtained by concatenating a plurality of face sample features, and the plurality of face sample features are obtained by performing feature extraction on the face sample image by using the first feature extraction model of the manufacturer and the plurality of second feature extraction models of the manufacturer or other different manufacturers. The target feature is obtained by concatenating the plurality of face sample features separately extracted by the manufacturer and the other manufacturers. When the second feature mapping model is trained, an output of the second feature mapping model needs to fit the target feature as much as possible. The trained second mapping model is the first feature mapping model. Face search is performed for the face image based on standard feature.

According to the first aspect, in some possible implementations, before the second feature mapping model is trained based on the face sample image, the first face sample feature, and the target feature corresponding to the face sample image, to obtain the first feature mapping model that meets an objective function, the method further includes: obtaining the face sample image; inputting the face sample image into N second feature extraction models to output N second face sample features, where N is a positive integer greater than or equal to 2; multiplying the N second face sample features by N preset coefficients in one-to-one correspondence; concatenating N second face sample features obtained through multiplication, to obtain a concatenated face sample feature; and obtaining, based on the concatenated face sample feature, a target feature corresponding to the face sample image, where a dimension quantity of the target feature is less than or equal to a sum of dimension quantities of the N second feature extraction models.

According to the first aspect, in some possible implementations, the method further includes: obtaining the face sample image, where the face sample image includes identity information; inputting the face sample image into the N second feature extraction models to output the N second face sample features; and performing face recognition on the face sample image based on the N second face sample features and the identity information, to obtain the N preset coefficients.

According to the first aspect, in some possible implementations, the method further includes: configuring the N preset coefficients for the N second feature extraction models, where the N preset coefficients are equal; or configuring the N preset coefficients for the N second feature extraction models according to a preset determining criterion.

According to the first aspect, in some possible implementations, the method further includes: obtaining, within a preset coefficient range, a coefficient combination corresponding to the N second feature extraction models; multiplying the N second face sample features by the corresponding coefficient combination; concatenating N second face sample features obtained through multiplication, to obtain a concatenated face sample feature; and performing face search for the face sample image based on the concatenated face sample feature, to obtain the preset coefficient that is in the coefficient combination and that meets the preset condition.

According to the first aspect, in some possible implementations, the obtaining, based on the concatenated face sample feature, a target feature corresponding to the face sample image includes: performing dimension reduction on the concatenated face sample feature; and determining a dimension-reduced face sample feature as the target feature corresponding to the face sample image.

According to the first aspect, in some possible implementations, the second feature mapping model includes an exclusive module and a shared module.

Correspondingly, the training a second feature mapping model based on the face sample image, the first face sample feature, and the target feature corresponding to the face sample image, to obtain the first feature mapping model includes: inputting the face sample image and a plurality of first face sample features into the exclusive module to output third face sample features, where the plurality of first face sample features are extracted from the face sample image by using a plurality of different first feature extraction models; inputting the third face sample features into the shared module to obtain a standard feature corresponding to the plurality of first face sample features; and training the exclusive module and the shared module based on the face sample image, the plurality of first face sample features, the standard feature corresponding to the plurality of first face sample features, and the target feature corresponding to the face sample image, to obtain the first feature mapping model.

According to the first aspect, in some possible implementations, the second feature mapping model includes an image branching module, a feature branching module, and a synthesis module.

Correspondingly, the training a second feature mapping model based on the face sample image, the first face sample feature, and the target feature corresponding to the face sample image, to obtain the first feature mapping model includes: inputting the face sample image into the image branching module to output a fourth face sample feature; inputting the first face sample feature into the feature branching module to output a fifth face sample feature, where the first face sample feature is extracted from the face sample image by using the first feature extraction model; inputting both the fourth face sample feature and the fifth face sample feature into the synthesis module, to obtain a standard feature corresponding to the first face sample feature; and training the image branching module, the feature branching module, and the synthesis module based on the face sample image, the first face sample feature, the standard feature corresponding to the first face sample feature, and the target feature corresponding to the face sample image, to obtain the first feature mapping model.

According to the first aspect, in some possible implementations, the performing face search for the face image based on the standard feature includes: determining a similarity between the standard feature and a standard feature of a first face sample image, where the first face sample image is any one of a plurality of face sample images; and when the similarity is greater than a first threshold, determining the first face sample image as a search target in the face image.

According to a second aspect, this application provides a face search apparatus, including: an interface module, configured to obtain a to-be-searched face image, where the to-be-searched face image may be an image shot by a camera or an image manually uploaded by a user; a feature extraction module, configured to perform feature extraction on the face image by using a first feature extraction model, to obtain a first face feature; a feature mapping module, configured to input the face image and the first face feature into a first feature mapping model to output a standard feature corresponding to the first face feature, where a feature output dimension quantity of the first feature extraction model is the same as a feature input dimension quantity of the first feature mapping model, and the first feature mapping model is obtained through training based on a target feature corresponding to a face sample image; and a face search module, configured to perform face search for a face image based on standard feature.

According to the second aspect, in some possible implementations, the target feature corresponding to the face sample image is obtained by concatenating a plurality of face sample features, and the face sample features are obtained by performing feature extraction on the face sample image by using a plurality of second feature extraction models.

According to the second aspect, in some possible implementations, the apparatus further includes: a mapping model training module, configured to: obtain the face sample image; input the face sample image into the first feature extraction model to output a first face sample feature; and train a second feature mapping model based on the face sample image, the first face sample feature, and the target feature corresponding to the face sample image, to obtain the first feature mapping model, where the second feature mapping models one-to-one correspond to the first feature extraction models. According to the second aspect, in some possible implementations, the apparatus further includes: a target feature obtaining module, configured to: before the mapping model training module obtains the first feature mapping model that meets an objective function, obtain the face sample image; input the face sample image into N second feature extraction models to output N second face sample features, where N is a positive integer greater than or equal to 2; multiply the N second face sample features by N preset coefficients in one-to-one correspondence; concatenate N second face sample features obtained through multiplication, to obtain a concatenated face sample feature; and obtain, based on the concatenated face sample feature, a target feature corresponding to the face sample image, where a dimension quantity of the target feature is less than or equal to a sum of dimension quantities of the N second feature extraction models.

According to the second aspect, in some possible implementations, the target feature obtaining module is further configured to: obtain the face sample image, where the face sample image includes identity information; input the face sample image into the N second feature extraction models to output the N second face sample features; and perform face recognition on the face sample image based on the N second face sample features and the identity information, to obtain the N preset coefficients.

According to the second aspect, in some possible implementations, the target feature obtaining module is specifically configured to: configure the N preset coefficients for the N second feature extraction models, where the N preset coefficients are equal; or configure the N preset coefficients for the N second feature extraction models according to a preset determining criterion.

According to the second aspect, in some possible implementations, the target feature obtaining module is specifically configured to: obtain, within a preset coefficient range, a coefficient combination corresponding to the N second feature extraction models; multiply the N second face sample features by the corresponding coefficient combination; concatenate N second face sample features obtained through multiplication, to obtain a concatenated face sample feature; and perform face search for the face sample image based on the concatenated face sample feature, to obtain the preset coefficient that is in the coefficient combination and that meets the preset condition.

According to the second aspect, in some possible implementations, the target feature obtaining module is further configured to: perform dimension reduction on the concatenated face sample feature; and determine a dimension-reduced face sample feature as the target feature corresponding to the face sample image.

According to the second aspect, in some possible implementations, the second feature mapping model includes an exclusive module and a shared module.

Correspondingly, the mapping model training module is further configured to: input the face sample image and a plurality of first face sample features into the exclusive module to output third face sample features, where the plurality of first face sample features are extracted from the face sample image by using a plurality of different first feature extraction models; input the third face sample features into the shared module to obtain a standard feature corresponding to the plurality of first face sample features; and train the exclusive module and the shared module based on the face sample image, the plurality of first face sample features, the standard feature corresponding to the plurality of first face sample features, and the target feature corresponding to the face sample image, to obtain the first feature mapping model.

According to the second aspect, in some possible implementations, the second feature mapping model includes an image branching module, a feature branching module, and a synthesis module.

Correspondingly, the mapping model training module is further configured to: input the face sample image into the image branching module to output a fourth face sample feature; input the first face sample feature into the feature branching module to output a fifth face sample feature, where the first face sample feature is extracted from the face sample image by using the first feature extraction model; input both the fourth face sample feature and the fifth face sample feature into the synthesis module, to obtain a standard feature corresponding to the first face sample feature; and train the image branching module, the feature branching module, and the synthesis module based on the face sample image, the first face sample feature, the standard feature corresponding to the first face sample feature, and the target feature corresponding to the face sample image, to obtain the first feature mapping model.

According to the second aspect, in some possible implementations, the face search module is specifically configured to: determine a similarity between the standard feature and a standard feature of a first face sample image, where the first face sample image is any one of a plurality of face sample images; and when the similarity is greater than a first threshold, determine the first face sample image as a search target in the face image.

In the second aspect, the interface module may be a receiving interface, a receiving circuit, a receiver, or the like. The feature extraction module, the feature mapping module, the face search module, the mapping model training module, and the target feature obtaining module may be one or more processors.

According to a third aspect, this application provides a face search device. The face search device may include a processor and a communication interface. The processor may be configured to support the face search device to implement the functions in any one of the first aspect or the possible implementations of the first aspect. For example, the processor may obtain a to-be-searched face image through the communication interface.

According to the third aspect, in some possible implementations, the face search device may further include a memory. The memory is configured to store computer-executable instructions and data required for the face search device. When the face search device runs, the processor executes the computer-executable instructions stored in the memory, so that the face search device performs the face search method in any one of the first aspect or the possible implementations of the first aspect.

According to a fourth aspect, this application provides a computer-readable storage medium. The computer-readable storage medium stores instructions. When the instructions are run on a computer, the face search method in any one of the first aspect is performed.

According to a fifth aspect, this application provides a computer program or a computer program product. When the computer program or the computer program product is executed on a computer, the computer is enabled to implement the face search method in any one of the first aspect.

It should be understood that the technical solutions in the second aspect to the fifth aspect of this application are consistent with the technical solution in the first aspect. Beneficial effects achieved in the aspects and the corresponding feasible implementations are similar, and details are not described again.

BRIEF DESCRIPTION OF DRAWINGS

To describe technical solutions in embodiments or the background of this application more clearly, the following describes the accompanying drawings used in the embodiments or the background of this application.

DESCRIPTION OF EMBODIMENTS

The following describes the embodiments of this application with reference to the accompanying drawings in the embodiments of this application. In the following description, specific aspects of the embodiments of this application are shown by reference to a part of this application and in a manner of description, or the accompanying drawings of specific aspects of the embodiments of this application may be used. It should be understood that the embodiments of this application may be used in other aspects, and may include structural or logical changes not depicted in the accompanying drawings. For example, it should be understood that the disclosure with reference to the described method may also be applied to a corresponding device or system for performing the method, and vice versa. For example, if one or more specific method steps are described, a corresponding device may include one or more units, such as functional units, to perform the described one or more method steps (for example, one unit performs one or more steps, or each of a plurality of units performs one or more of a plurality of steps), even though the one or more units are not explicitly illustrated or described in the accompanying drawings. In addition, for example, if a specific apparatus is described based on one or more units, such as functional units, a corresponding method may include one step to perform functionality of one or more units (for example, one step is used to perform functionality of one or more units, or each of a plurality of steps is used to perform functionality of one or more of a plurality of units), even though the one or more steps are not explicitly illustrated or described in the accompanying drawings. Further, it should be understood that, unless otherwise clearly stated, the example embodiments and/or features of aspects described herein may be concatenated with each other.

Figure 1:
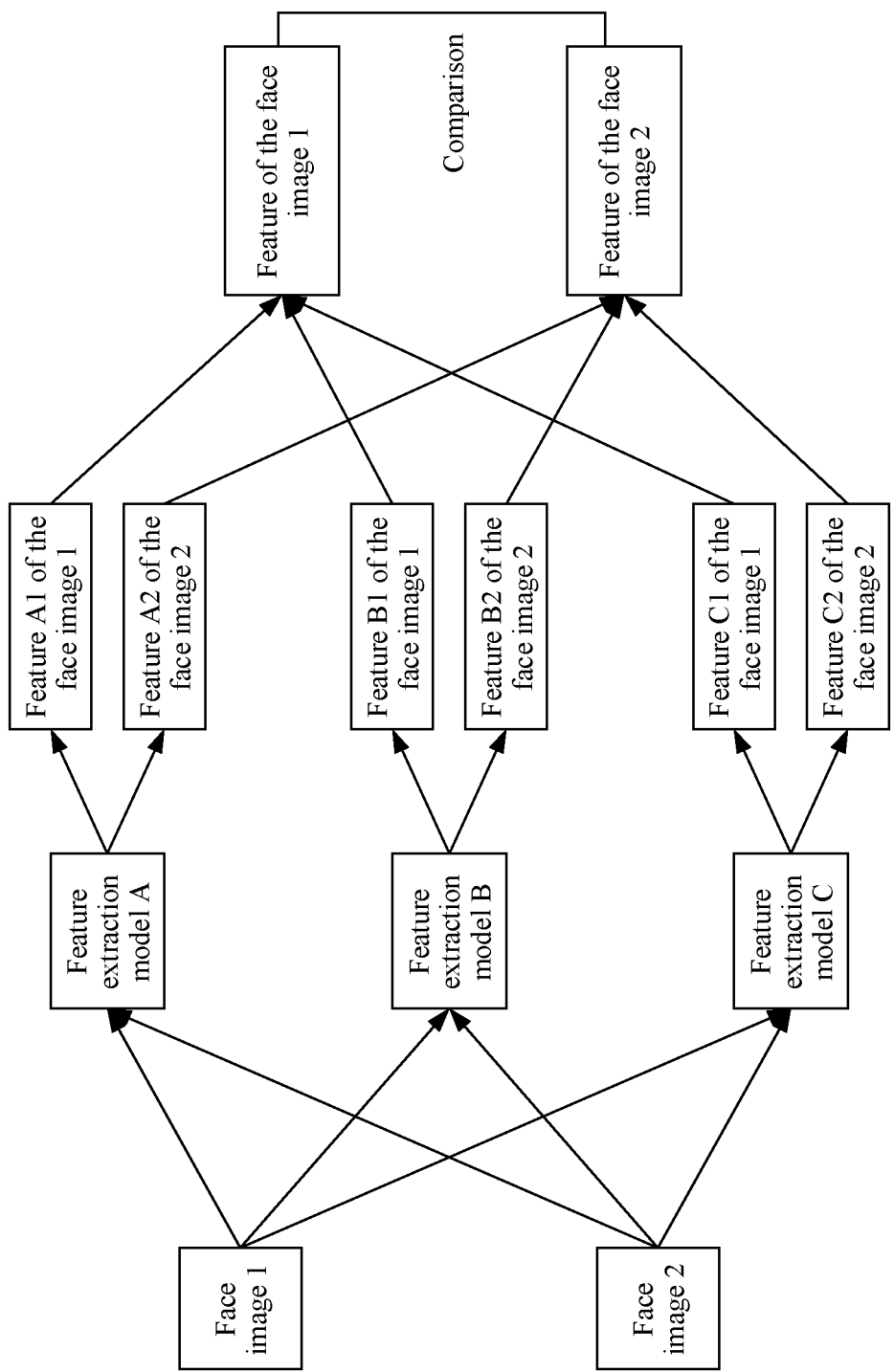
FIG. 1 is a schematic flowchart of a face search method.

An embodiment of this application provides a face search method. The method may be widely applied to related scenarios such as identity recognition and identity authentication. A face search system does not directly calculate similarities between a to-be-searched face image and face images in the face library, but represents all the images as features and calculates the similarities between the to-be-searched face image and the face images in the face library by using these features, to find one or more face images most similar to the to-be-searched face image. Usually, there are a plurality of feature extraction models in the face search system, features of all face images need to be extracted by using all feature extraction models, and features extracted from a same face image are concatenated or undergo dimension compression by using a dimension reduction method, to obtain a final output feature. FIG. 1 is a schematic flowchart of a face search method. Refer to FIG. 1. There are different feature extraction models A, B, and C in a face search system, and a face image 1 and a face image 2 are separately input into the three feature extraction models, to obtain features A1, B1, and C1 of the face image 1 and features A2, B2, and C2 of the face image 2. Then, the face search system concatenates the three features of each of the face images to obtain a final output feature, that is, a feature of the face image 1 and a feature of the face image 2. Finally, the face search system compares the feature of the face image 1 with the feature of the face image 2. In this case, face search is completed. However, because all the feature extraction models need to be applied to each face image, a calculation amount of the system exponentially increases with a quantity of feature extraction models. Optionally, the feature extraction models A, B, and C may be feature extraction models in different feature dimensions, or may be a plurality of feature extraction models that have a same function in a same feature dimension.

Figure 2:
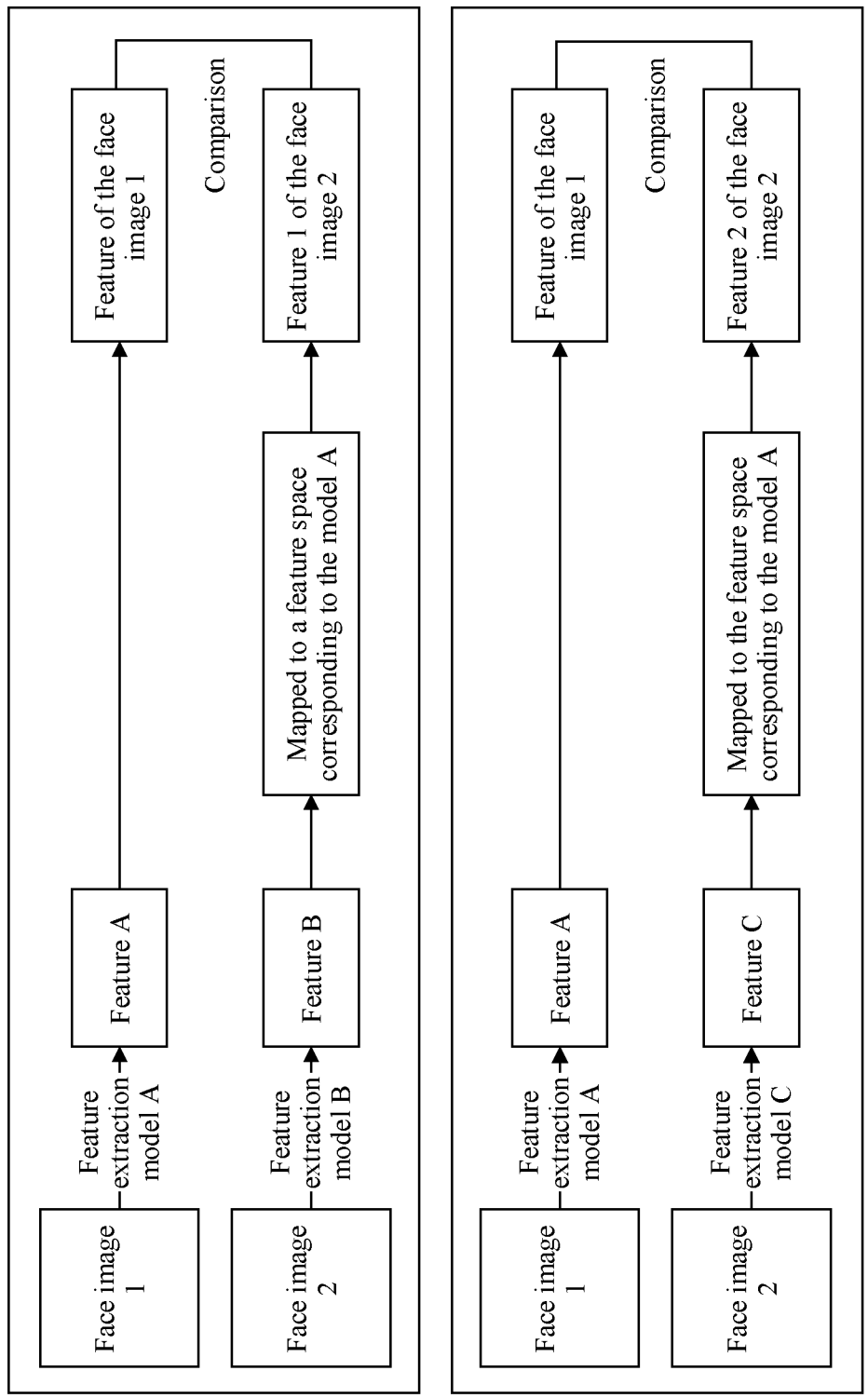
FIG. 2 is a schematic flowchart of another face search method.

An embodiment of this application further provides a face search method. A feature mapping model is used in the method. A face search system maps a feature (that is, a source feature) extracted by a feature extraction model to a feature space corresponding to another feature extraction model (that is, a target feature space), and compares features in the feature space. In this way, mutual search between the features is implemented, to complete face search. For example, FIG. 2 is a schematic flowchart of another face search method. Refer to FIG. 2. A feature A (that is, a feature of a face image 1) is obtained from the face image 1 by using a feature extraction model A, a feature B is obtained from a face image 2 by using a feature extraction model B, and a feature C is obtained from the face image 2 by using a feature extraction model C. Each of the feature B and the feature C is mapped by a feature mapping model to a feature space corresponding to the model A, to obtain a feature 1 of the face image 2 and a feature 2 of the face image 2. The feature 1 of the face image 2 and the feature 2 of the face image 2 are compared with the feature (namely, the feature A) of the face image 1 in the feature space corresponding to the model A. Two feature pairs are formed: the feature A and the feature 1 of the face image 2, and the feature A and the feature 2 of the face image 2. Comparison of each feature pair is performed in the feature space corresponding to the model A. In this way, mutual search between the features is implemented, to complete face search. In this embodiment of this application, because all features are mapped to the feature space corresponding to the feature extraction model A, the feature A does not need to be mapped, but may be directly used as the feature of the face image 1 to be compared with the feature of the face image 2. To compare the features, one feature mapping model needs to be trained for each feature pair. When a quantity of feature extraction models is n (n≥2), a quantity $C_n^2$ of feature mapping models may be shown in the following formula (1):

$$C_n^2 = \frac{n(n-1)}{2} \quad (1)$$

It can be learned that a large quantity of feature mapping models need to be trained in the face search system. Further, because the feature mapping model uses only the source feature as an input, a feature mapping effect cannot be ensured when an expression capability of the source feature is poor.

Figure 3:
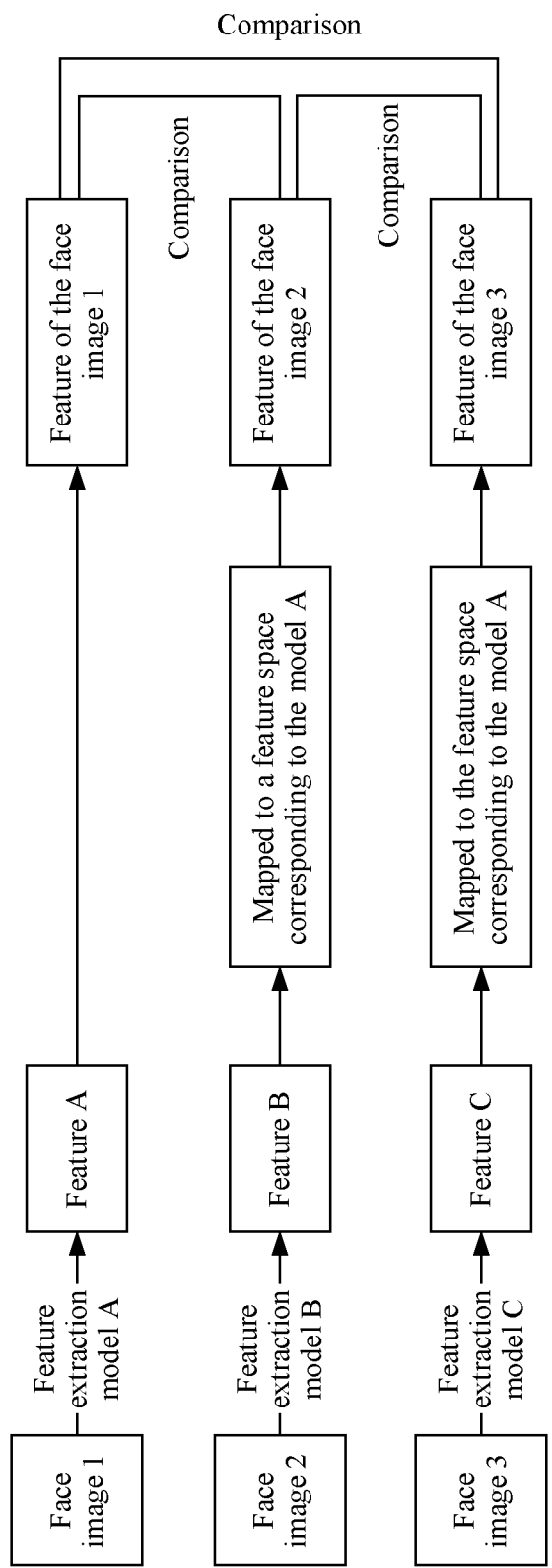
FIG. 3 is a schematic flowchart of still another face search method.

Further, an embodiment of this application provides another face search method. In the method, different face features can be extracted by using different feature extraction models, but cannot be directly compared. To directly compare the different face features, a face search system needs to map all of the extracted face features to a same feature space, and compares the features in the feature space. In this way, mutual search between the features is implemented, to complete face search. For example, FIG. 3 is still another schematic flowchart of a face search method according to an embodiment of this application. Refer to FIG. 3. A face search system inputs a face image 1 into a feature extraction model A to obtain a feature A, inputs a face image 2 into a feature extraction model B to obtain a feature B, inputs a face image 3 into a feature extraction model C to obtain a feature C, and then maps the feature B and the feature C to a same feature space (it is assumed that the feature space is a feature space corresponding to the feature extraction model A) to obtain a feature of the face image 2 and a feature of the face image 3. In this embodiment of this application, because all features are mapped to the feature space corresponding to the feature extraction model A, the feature A does not need to be mapped, but may be directly used as a feature of the face image 1 to be compared with the feature of the face image 2 and the feature of the face image 3. In the feature space corresponding to the feature extraction model A, the feature of the face image 2 and the feature of the face image 3 may also be directly compared. In this way, mutual search between the features is implemented, to complete face search. However, performance of the feature extraction models A, B, and C is different in different scenarios. When an advantage of a single feature extraction model in each scenario is not prominent, it is a problem to select a feature space corresponding to a specific model as a feature space that the features are finally mapped to. Further, because all of the features are finally mapped to a feature space corresponding to the single feature extraction model, a plurality of feature extraction models are not comprehensively applied.

To resolve the foregoing problem, an embodiment of this application provides a face search method. The face search method may be applied to the foregoing face search system. In this embodiment of this application, the face search system may be disposed on devices such as a security surveillance device and an access control gate.

Figure 4:
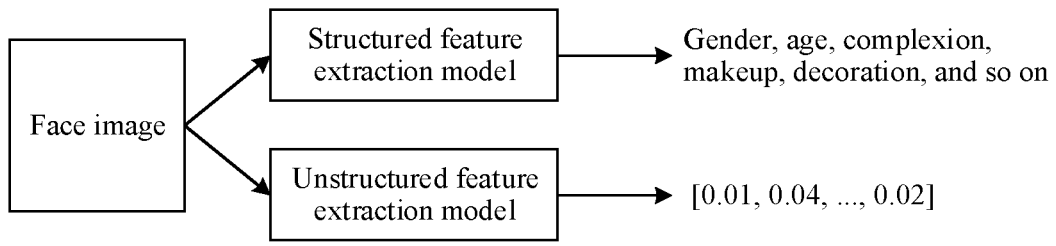
FIG. 4 is a schematic diagram of face features according to an embodiment of this application.

It should be noted that, in the embodiments of this application, FIG. 4 is a schematic diagram of face features according to an embodiment of this application. Refer to FIG. 4. The face features in a face image may be classified into structured features and unstructured features. The structured features may include features used to represent face attributes. The face attributes may refer to some specific physical meanings of the face image, for example, age, gender, and angle, and are extracted from the face image by using a structured feature extraction model. The unstructured features may include a vector used to represent face features. The face features may be features in the face image that have no specific physical meaning, and include a string of digits. The face features may also be referred to as feature vectors, and are extracted from the face image by using an unstructured feature extraction model. A similarity between the feature vectors may be used to represent a similarity between a to-be-searched face image and a face template image.

Both the structured feature extraction model and the unstructured feature extraction model are machine learning models (for example, convolutional neural networks (convolutional neural networks, CNN)). A CNN is essentially input-to-output mapping. The CNN can learn a large quantity of mapping relationships between inputs and outputs without any precise mathematical expression between the inputs and the outputs. After training samples are collected, the CNN is trained. In this way, the CNN has a capability of mapping between an input and an output. Certainly, the structured feature extraction model and the unstructured feature extraction model may alternatively be other machine learning models. This is not specifically limited in this embodiment of this application.

In some possible implementations, a "feature" in the following embodiments may be an unstructured feature, or may be a concatenated feature obtained by concatenating the structured feature and the unstructured feature. A "feature extraction model" may be an unstructured feature extraction model, or may be a model combination including a structured feature extraction model and an unstructured feature extraction model. This is not specifically limited in this embodiment of this application.

Figure 5:
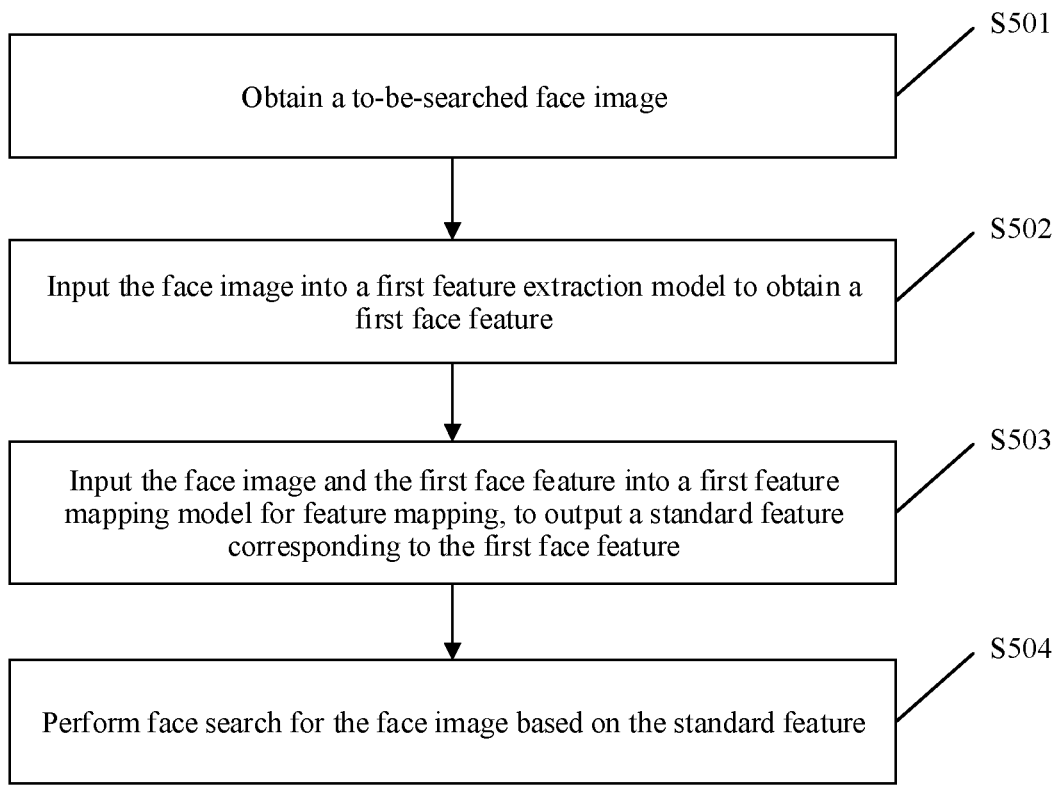
FIG. 5 is a schematic flowchart of a face search method according to an embodiment of this application.

FIG. 5 is a schematic flowchart of a face search method according to an embodiment of this application. Refer to FIG. 5. The method may include the following steps.

S501: Obtain a to-be-searched face image.

In this embodiment of this application, the face image obtained by a face search system may be an image directly captured by the search system, for example, an image shot by a camera of the face search system. Alternatively, the face image may be an image manually input by a user into the face search system. If the user needs to search for a target person, an image of the target person is directly input into the face search system. Alternatively, the face image may be an image of a specific person in a gallery of the face search system.

In this embodiment of this application, the face search system receives the input to-be-searched face image. Optionally, the face search system may further receive an input image (that is, a face template image) in a gallery set. The face template image can be used for comparison with the face image to implement mutual feature search for the face image. In this case, face search for the face image is completed.

S502: Input the face image into a first feature extraction model to obtain a first face feature.

In this embodiment of this application, a face search device may train the first feature extraction model by using a large quantity of face sample images, so that the face search device can obtain the first face feature of the face image after inputting the face image into the first feature extraction model. Optionally, the first feature extraction model may be an unstructured feature extraction model, or may be a model combination including a structured feature extraction model and an unstructured feature extraction model.

S503: Input the face image and the first face feature into a first feature mapping model for feature mapping, to output a standard feature corresponding to the first face feature.

In this embodiment of this application, the face search device may pre-train a first feature mapping model for the first feature extraction model by using the face sample image. A feature output dimension quantity of the first feature extraction model is the same as a feature input dimension quantity of the first feature mapping model. Then, the face search device may input the to-be-searched face image and the first face feature corresponding to the to-be-searched face image into the first feature mapping model for feature mapping, to output the standard feature.

It should be noted that the first feature mapping model is obtained through training based on the face sample image and the target feature corresponding to the face sample image. Optionally, the target feature corresponding to the face sample image is obtained by concatenating a plurality of face sample features, and the face sample features are obtained by performing feature extraction on the face sample image by using a plurality of second feature extraction models. The plurality of second feature extraction models include the first feature extraction model. The plurality of second feature extraction models have at least different training samples, different model structures, different training policies, or different feature dimension quantities.

In a possible implementation, the first feature extraction model and the second feature extraction model may be a same feature extraction model, or may be different feature extraction models. The second feature extraction models may be second feature extraction models of a manufacturer or second feature extraction models of other different manufacturers. The second feature extraction models may include the first feature extraction model. In other words, the second feature extraction models may include another feature extraction model in addition to the first feature extraction model. The second feature extraction models of the different manufacturers may also have different training samples, different model structures, different training policies, or different feature dimension quantities. For example, a feature dimension quantity of a second feature extraction model of a manufacturer A is 256, while a feature dimension quantity of a second feature extraction model of a manufacturer B is 512.

S504: Perform face search for the face image based on the standard feature.

In this embodiment of this application, after obtaining the standard feature of the to-be-searched face image in S503, the face search device may directly compare the standard feature with standard features of a plurality of face template images, to find a most similar feature. Then, one or more face template images are obtained to implement mutual feature search and complete face search.

It should be noted that the plurality of face template images and the to-be-searched face image may both be input into the face search device, S501 to S503 are sequentially performed to complete face feature extraction, and then comparison with the standard feature of the to-be-searched face image is performed. Alternatively, the face template images are input into the face search device in advance to complete face feature extraction, to obtain a standard feature corresponding to each face template image. Then, the standard features corresponding to the face template images are stored. In this case, after the standard feature of the to-be-searched face image is subsequently obtained, the standard features corresponding to the face template images are read and compared to complete face search. Certainly, feature extraction and feature comparison may be performed on the to-be-searched face image and the face template image in another manner provided that face search can be completed. This is not specifically limited in this embodiment of this application.

The following describes a process of performing face search for the face image based on the standard feature in S504.

When searching the face image based on the standard feature, a face recognition apparatus needs to compare the standard feature with standard features of a plurality of face sample images. The standard features of the plurality of face sample images may be provided by a manufacturer or another manufacturer. The face recognition apparatus determines a standard feature of a face sample image currently compared with the standard feature as a standard feature of a first face sample image, and determines a similarity between the standard feature and the standard feature of the first face sample image. When the similarity is greater than a first threshold, the first face sample image is a face image search target.

This method can implement mutual feature search between different models of a same manufacturer and mutual feature search between different manufacturers.

The following describes a process of training the first feature mapping model in S503.

Figure 6:
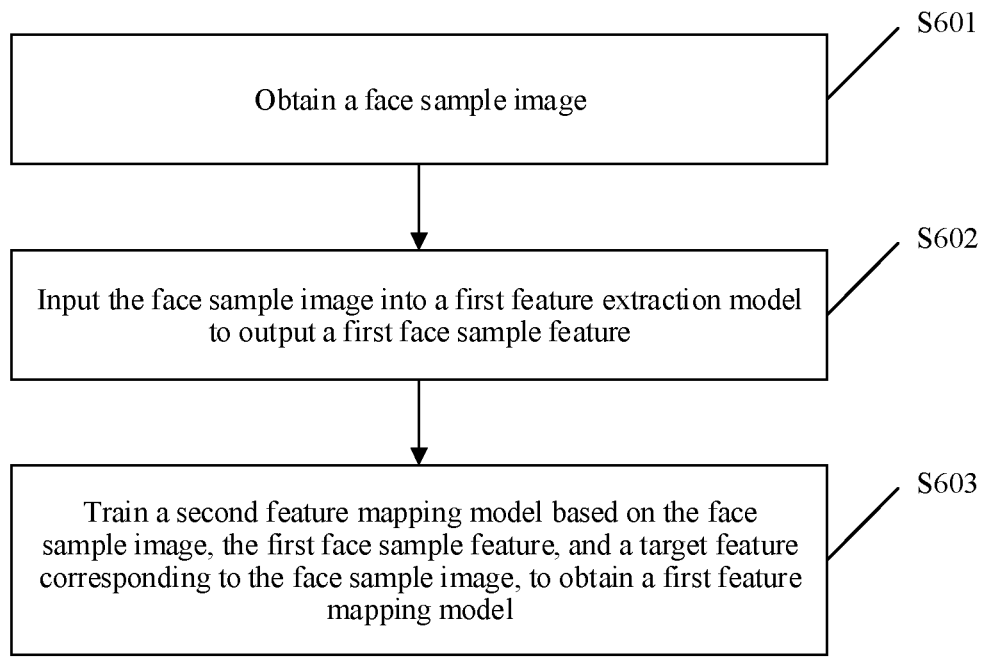
FIG. 6 is a schematic flowchart of a method for training a first feature mapping model according to an embodiment of this application.

FIG. 6 is a schematic flowchart of a method for training a first feature mapping model according to an embodiment of this application. Refer to FIG. 6. The method may include the following steps.

S601: Obtain a face sample image.

In this embodiment of this application, a face search device obtains an input face sample image. The face sample image may be one or more images in a large quantity of face sample images.

S602: Input the face sample image into a first feature extraction model to output a first face sample feature.

In this embodiment of this application, the face search device inputs the face sample image into the first feature extraction model, to obtain the first face sample feature of the face sample image. The first face sample feature may be an unstructured feature of the face sample image, or may be a concatenated feature formed by concatenating a structured feature and an unstructured feature of the face sample image.

S603: Train a second feature mapping model based on the face sample image, the first face sample feature, and a target feature corresponding to the face sample image, to obtain a first feature mapping model.

The second feature mapping model corresponds to the first feature extraction model.

In this embodiment of this application, the face search device may input the face sample image into a plurality of different feature extraction models to output a plurality of face sample features, multiply each face sample feature by a corresponding preset coefficient, concatenate face sample features obtained through multiplication, and finally obtain, based on the concatenated face sample feature, the target feature corresponding to the face sample image, which may also be referred to as a target standard feature. Then, the face search device inputs the face sample image and the first face sample feature corresponding to the face sample image into the second feature mapping model to output a standard sample feature, and adjusts a parameter of the second feature mapping model to maximize a similarity between the standard sample feature and the target feature. In this case, optimizing an objective function may be making a cosine similarity between the standard sample feature and the target feature be as large as possible. When the objective function converges, the second feature mapping model is trained, and the trained second feature model is the first feature mapping model.

In this embodiment of this application, the second feature mapping model may be a feature mapping model obtained by a manufacturer through sample training, or a feature mapping model obtained through cooperative training between the manufacturer and another manufacturer. Specifically, only a face search device of the manufacturer or the face search device of the manufacturer and the another manufacturer inputs the face sample image into a plurality of different feature extraction models to output a plurality of face sample features, multiplies each face sample feature by a corresponding preset coefficient, concatenates face sample features obtained through multiplication, and finally obtains, based on the concatenated face sample feature, a target feature corresponding to the face sample image. Then, the face search device of the manufacturer inputs the face sample image and the first face sample feature corresponding to the face sample image into the second feature mapping model to output a standard sample feature, and adjusts a parameter of the second feature mapping model to maximize a similarity between the standard sample feature and the target feature (where the target feature is obtained by the manufacturer or is obtained through cooperation between the manufacturer and the another manufacturer). In this case, optimizing an objective function may be making a cosine similarity between the standard sample feature and the target feature be as large as possible. When the objective function converges, the second feature mapping model is trained, and the trained second feature model is the first feature mapping model.

The solution of the present invention may be used for mutual feature search between models of different versions of a same manufacturer. For example, the manufacturer A has deployed a face search system, and currently needs to upgrade an old feature extraction model to a new feature extraction model. Mutual feature search between the new and old models may be completed by performing the following operations: training a new feature mapping model that matches the new feature extraction model and an old feature mapping model that matches the old feature extraction model; inputting, into the old feature mapping model, an image in a gallery set and features extracted by using the old feature extraction model, to obtain a standard feature of the image in the gallery set; inputting a to-be-searched image into the new feature extraction model to extract features, and inputting both the to-be-searched image and the features extracted by using the new feature extraction model into the new feature mapping model to obtain a standard feature of the to-be-searched image; and performing search and comparison between the standard feature of the to-be-searched image and the standard feature of the image in the gallery set. An image with a higher similarity in the gallery set is ranked first.

The solution of the present invention may alternatively be used for mutual feature search between models of a same manufacturer that run on different devices. For example, if a model of the manufacturer A that runs on a central server is a large feature extraction model (where a structure of the model is complex), and a model that runs on a camera is a small feature extraction model (where a structure of the model is light), mutual feature search between the large and small models may be completed by performing the following operations: training a large feature mapping model that matches the large feature extraction model and a small feature mapping model that matches the small feature extraction model; extracting, by using the large feature extraction model, features of an image stored in the central server, and inputting both the features and the image into the large feature mapping model to obtain a standard feature of the image in the central server; extracting, by using the small feature extraction model, features of an image stored in the camera, and inputting both the features and the image into the small feature mapping model to obtain a standard feature of the image in the camera; and comparing the standard feature of the image in the central server with the standard feature of the image in the camera to calculate a similarity for search and sorting.

The solution of the present invention may alternatively be used for mutual feature search between models of different manufacturers. For example, if a model of the manufacturer A is a feature extraction model A, and a model of the manufacturer B is a feature extraction model B, mutual feature search between the models A and B may be completed by performing the following operations: training a feature mapping model A that matches the feature extraction model A and a feature mapping model B that matches the feature extraction model B; extracting, by using the feature extraction model A, features of an image allocated to the manufacturer A, and inputting both the feature and the image into the feature mapping model A, to obtain a standard feature of the image of the manufacturer A; extracting, by using the feature extraction model B, features of an image allocated to the manufacturer B, and inputting both the feature and the image into the feature mapping model B to obtain a standard feature of the image of the manufacturer B; and comparing the standard feature of the image of the manufacturer A with the standard feature of the image of the manufacturer B to obtain a similarity between the standard features for search and sorting.

It should be noted that the plurality of feature extraction models may be unstructured feature extraction models, or may be a model combination including a structured feature extraction model and an unstructured feature extraction model. This is not specifically limited in this embodiment of this application.

Figure 7:
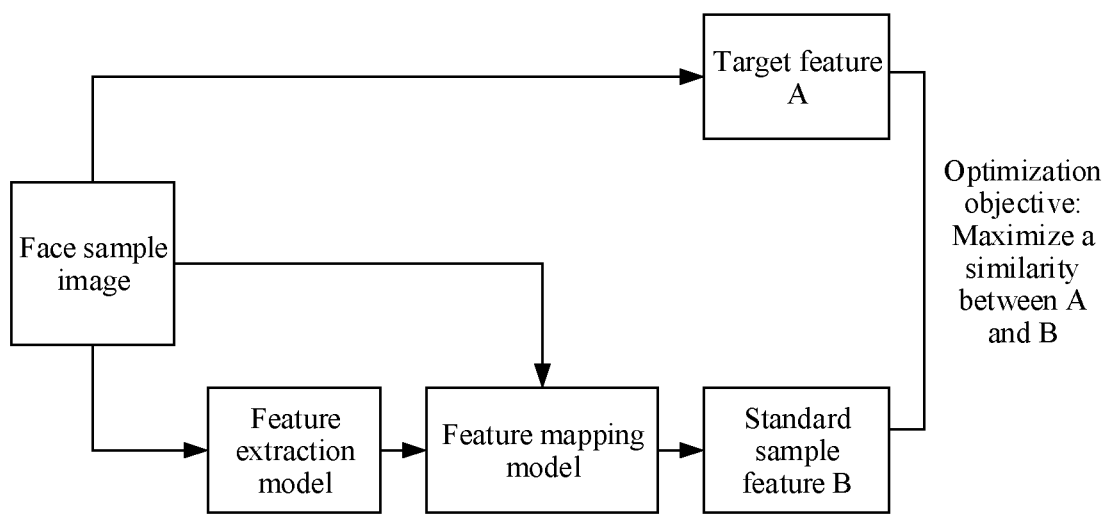
FIG. 7 is a schematic flowchart of a method for training a feature mapping model according to an embodiment of this application.

For example, FIG. 7 is a schematic flowchart of a method for training a feature mapping model according to an embodiment of this application. Refer to FIG. 7, in a training phase, a face search device first obtains a target feature corresponding to a face sample image, and inputs the face sample image into a feature extraction model. A face sample feature is obtained by using the feature extraction model. Then, the face search device inputs the face sample image and the face sample feature into a feature mapping model corresponding to the feature extraction model, to output a standard sample feature B. Then, the face search device calculates a similarity between the target feature A and the standard sample feature B, and adjusts each parameter in the feature mapping model by optimizing an objective function, that is, making a cosine similarity between the features A and B be as large as possible, until the objective function converges. In this way, the feature mapping model is trained.

In some possible implementations, the cosine similarity between the two features may be calculated according to formula (2):

$$\text{Cosine similarity} = \cos(\theta) = \frac{A \cdot B}{\|A\|\|B\|} = \frac{\sum_{i=1}^{k} A_i \times B_i}{\sqrt{\sum_{i=1}^{k}(A_i)^2} \times \sqrt{\sum_{i=1}^{k}(B_i)^2}} \quad (2)$$

$A_i$ and $B_i$ indicate components of the features A and B respectively, k is a quantity of components of A and B, and k is a positive integer.

Certainly, optionally, the objective function may be the cosine similarity, or may be another function that may measure the similarity between the features (for example, a Euclidean similarity or a Euclidean distance). This is not specifically limited in this embodiment of this application.

In some possible implementations, the face search device may obtain, by using the following method, the target feature corresponding to the face sample image. First, the face search device obtains the face sample image. Optionally, the face search device obtains an input face sample image, where the face sample image may be one or more images in a large quantity of face sample images. Then, the face search device inputs the face sample image into N second feature extraction models to output N second face sample features. N is a positive integer greater than or equal to 2. Optionally, the face search device inputs the face sample image into N different second feature extraction models. The second feature extraction models may be unstructured feature extraction models, or may be a model combination including a structured feature extraction model and an unstructured feature extraction model. This is not specifically limited in this embodiment of this application. The face search device may output N second face sample features by using the N second feature extraction models. One second feature extraction model outputs one second face sample feature. Next, the face search device multiplies the N second face sample features by N preset coefficients by bits in one-to-one correspondence. In this case, different coefficients are assigned to features extracted by using the different feature extraction models having different capabilities, effectively implementing matching between the feature extraction models and their capabilities. The face search device concatenates N second face sample features obtained through multiplication, to obtain a concatenated face sample feature. The face search device obtains, based on the concatenated face sample feature, a target feature corresponding to the face sample image. A dimension quantity of the target feature is less than or equal to a sum of dimension quantities of the N second feature extraction models. It can be learned that, in a process of calculating the target feature, the features corresponding to the plurality of feature extraction models are concatenated, and the concatenated feature is used as a basis for constructing the target feature, so that available information can be maximized.

In some optional implementations, after a batch of data is prepared, the face search device may obtain a dimension-reduced matrix by using, for example, a principal component analysis (principal component analysis, PCA) algorithm, a linear discriminant analysis (linear discriminant analysis, LDA) algorithm, or an autoencoder (autoencoder, AE). Then, the face search device multiplies any concatenated face sample feature by the dimension-reduced matrix, to obtain a dimension-reduced face sample feature, and determines the dimension-reduced face sample feature as the target feature corresponding to the face sample image. In this embodiment of this application, dimension reduction is performed on the concatenated feature. This can shorten feature comparison duration, improve search efficiency, remove redundant information, and can improve robustness of a standard feature.

It should be noted that the AE is a neural network in which a backpropagation algorithm is used to make an output value be equal to an input value. The AE includes two parts: an encoder and a decoder. In this embodiment of this application, the encoder first compresses an input concatenated feature into a latent spatial representation, where a dimension of the latent spatial representation is lower than that of the input concatenated feature. Then, the decoder reconstructs an output (whose dimension is the same as that of the input concatenated feature) by using the latent spatial representation. The output should be as close as possible to the input concatenated feature. The objective function can be set as a cosine similarity between the input concatenated feature and a target feature output by the encoder, to achieve this objective. After a form of the objective function is determined, different face sample features are input. In this case, gradients of the objective function for parameters in the encoder and the decoder can be calculated, and the parameters in the encoder and the decoder can be adjusted based on the gradients, until a change in an updated trained objective function is less than a specified value (that is, the objective function has converged). In this way, the parameters of both the encoder and the decoder are determined. In this case, the encoder can implement, by using the parameters obtained through training, a dimension reduction function on the input concatenated feature.

Figure 8:
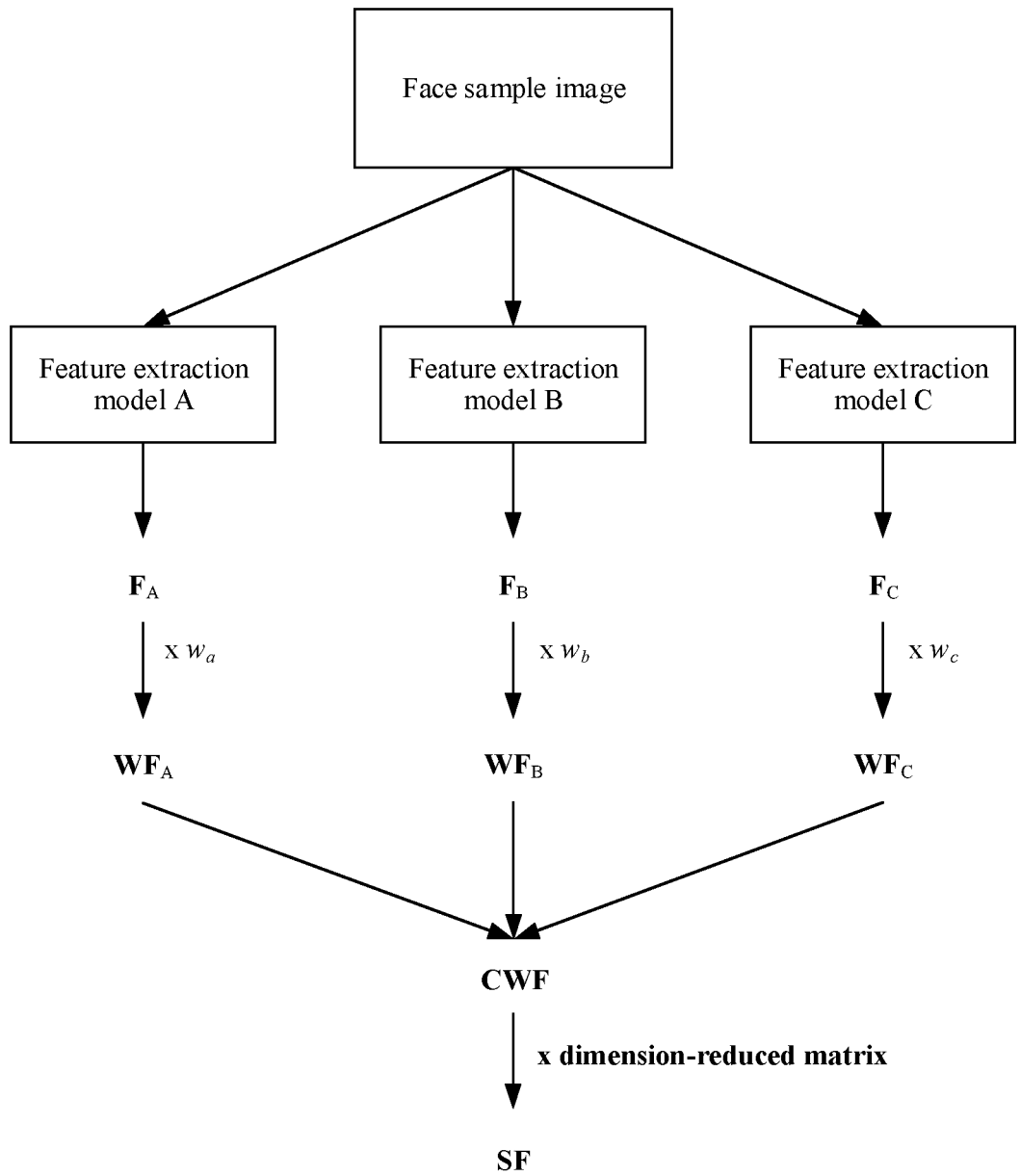
FIG. 8 is a schematic flowchart of a method for obtaining a target feature corresponding to a face sample image according to an embodiment of this application.

For example, FIG. 8 is a schematic flowchart of a method for obtaining a target feature corresponding to a face sample image according to an embodiment of this application. Refer to FIG. 8, there are three second feature extraction models A, B, and C in a face search device. Preset coefficients corresponding to the feature extraction models satisfy: $w_a=0.3$, $w_b=0.5$, and $w_c=0.2$. Face sample features obtained from the input face sample image by using the second feature extraction models A, B, and C satisfy: $F_A=[0.04, \ldots, 0.08]$, $F_B=[0.06, \ldots, 0.03]$, and $F_C=[0.05, \ldots, 0.05]$. The face search device may multiply the face sample features $F_A$, $F_B$, and $F_C$ by corresponding $w_a$, $w_b$, and $w_c$ by bits, that is, perform weighting on the face sample features by using the preset coefficients. Specifically, $WF_A$ obtained by multiplying $F_A$ by $w_a$ bit by bit satisfies $WF_A=[0.012, \ldots, 0.024]$, $WF_B$ obtained by multiplying $WF_B$ by $w_b$ bit by bit satisfies $WF_B=[0.03, \ldots, 0.015]$, and $WF_C$ obtained by multiplying $F_C$ by $w_c$ bit by bit satisfies $WF_C=[0.01, \ldots, 0.01]$. Then, the face search device concatenates $WF_A$, $WF_B$, and $WF_C$, to obtain a concatenated face sample feature CWF that satisfies CWF=$[0.012, \ldots, 0.024, 0.03, \ldots, 0.015, 0.01, \ldots, 0.01]$. Finally, the CWF is multiplied by a dimension-reduced matrix to obtain a target feature SF that satisfies SF=$[0.03, \ldots, 0.07]$.

In this embodiment of this application, the preset coefficients may be obtained in, but not limited to, the following manners.

In a first manner, the preset coefficients may be used as learnable parameters, and the preset coefficients are determined by training face recognition models. Specifically, the face search device may first obtain the face sample image. In this case, the face sample image includes corresponding identity information. Then, the face search device inputs the face sample image into N second feature extraction models to output N second face sample features. Then, the face search device performs face recognition on the face sample image based on the N second face sample features and the identity information, to obtain N preset coefficients. Optionally, in a process of obtaining the preset coefficients, the face recognition models may be used, and input data to the face recognition models may be second face sample features extracted by using the second feature extraction models and corresponding identity information. Optimizing an objective function may be making face sample features with same identity information be as close as possible, and face sample features with different identity information be as far as possible. After determining a form of the objective function, the face search device inputs the N second face sample features and the corresponding identity information into the face recognition models, and calculates a gradient of the objective function for a parameter in a face recognition model and the preset coefficients that need to be determined. The parameters in the face recognition models and the preset coefficients that need to be determined may be adjusted based on the gradients, until a change in an updated objective function is less than a specified value (that is, the objective function converges), and a value of a preset coefficient that needs to be determined at this time is used as a final value. In this way, the foregoing preset coefficients are obtained.

In some possible implementations, the objective function used when the preset coefficients are obtained may be a triplet loss function shown in formula (3):

$$\Sigma_i^M \max\left(\left[\|f(x_i^a) - f(x_i^p)\|_2^2 - \|f(x_i^a) - f(x_i^n)\|_2^2 + \alpha\right], 0\right) \quad (3)$$

M is a quantity of training samples, $x_i^a$ and $f(x_i^a)$ are the face sample image and a feature thereof, $x_i^p$ and $f(x_i^p)$ are a face sample image including same identity information as the face sample image and a feature thereof, $x_i^n$ and $f(x_i^n)$ are a face sample image including identity information different from that of the face sample image and a feature thereof, and $\alpha$ is a difference between an expected distance between positive sample pairs and a distance between negative sample pairs. When the distance between negative sample pairs is $\alpha$ greater than the distance between positive sample pairs, the triplet loss function value is 0. Otherwise, the triplet loss function value is greater than 0.

In this embodiment of this application, minimizing the objective function allows features with a same identity to be as close as possible and features with different identities to be as far as possible. It should be noted that a form of the objective function is not limited in this embodiment of this application, and any objective function that may be used to train a single-face recognition model may be used in the technical solutions described in this embodiment of this application.

In a second manner, the preset coefficients may be preconfigured for the second feature extraction models. In this case, N preset coefficients whose values are equal are configured for the N second feature extraction models.

In a third manner, the preset coefficients may be N preset coefficients configured for the N second feature extraction models according to a preset determining criterion. For example, search accuracy is used as a determining criterion. It is assumed that there are three second feature extraction models A, B, and C in the face search device, and search accuracy of the second feature extraction models is 0.98, 0.95, and 0.9. The face search device may determine preset coefficients of the second feature extraction models A, B, and C as 0.98, 0.95, and 0.9. For another example, a similarity between face sample images including same identity information is used as a determining criterion. It is assumed that a feature extraction model is specific for a batch of identity information, and each piece of identity information corresponds to a plurality of different face sample images. For each piece of identity information, the face search device calculates an average similarity $S_a$ between features extracted from every two face sample images by using second feature extraction models, and calculates an average value $AS_a$ of these $S_a$ after obtaining $S_a$ corresponding to all identity information. For example, if $AS_a$ of the second feature extraction models A, B, and C is 0.8, 0.6, and 0.5, preset coefficients of the second feature extraction models A, B, and C are determined as 0.8, 0.6, and 0.5.

In a fourth manner, the preset coefficients may be obtained based on hyperparameter search, and all methods used for hyperparameter search may be used for coefficient search. Specifically, the face search device may obtain, within a preset coefficient range, a coefficient combination corresponding to the N second feature extraction models, then multiply the N second face sample features by the corresponding coefficient combination, and then concatenate N second face sample features obtained through multiplication, to obtain a concatenated face sample feature. Finally, the face search device performs face search for the face sample image based on the concatenated face sample feature, to obtain a preset coefficient that is in the coefficient combination and that meets a preset condition. For example, in grid search, it is assumed that there are three second feature extraction models A, B, and C in the face search device, and a coefficient range of each of the second feature extraction models ranges from 0 to 1. A, B, and C each are evenly divided into 10 parts within the coefficient range. To be specific, coefficients of each of A, B, and C include a total of 11 coefficients: 0, 0.1, 0.2, 0.3, 0.4, 0.5, 0.6, 0.7, 0.8, 0.9, and 1. Therefore, there are a total of 11×11×11=1331 coefficient combinations for A, B, and C. The 1331 coefficient combinations are used to concatenate the N face sample features. A concatenated face sample feature is used for face search. A group of hyperparameters with highest search accuracy (for example, coefficient combinations of A, B, and C) are determined as final preset coefficients.

Certainly, the foregoing manners are merely examples of determining the preset coefficients. The face search device may alternatively determine the preset coefficients in another manner. This is not specifically limited in this embodiment of this application.

In some possible implementations, the face search device may further perform joint training for mapping of a plurality of face sample features. The second feature mapping model includes an exclusive module and a shared module. It is assumed that a neural network model includes seven layers, where first four layers may belong to exclusive modules, and the last three layers may belong to shared modules. The shared modules and the exclusive modules are both neural network layers. A difference between the shared module and the exclusive module is that a parameter of the exclusive module may change more flexibly, to adapt to a feature of each second face sample feature. However, a parameter of the shared module needs to process inputs from a plurality of exclusive modules, and all the second face sample features are comprehensively applied. As a result, the parameter of the shared module has a stronger limitation in a training process. In this case, it can be learned that the exclusive module can learn an attribute of a feature, and the shared module can learn a common attribute of features of all models.

Correspondingly, S603 may include: inputting the face sample image and a plurality of first face sample features into the exclusive module for feature mapping, to output third face sample features, where the plurality of first face sample features are extracted from the face sample image by using a plurality of different first feature extraction models; inputting the third face sample features into the shared module to obtain a standard feature corresponding to the plurality of first face sample features; and training the exclusive module and the shared module based on the face sample image, the plurality of first face sample features, the standard feature corresponding to the plurality of first face sample features, and the target feature corresponding to the face sample image, to obtain the first feature mapping model.

Figure 9:
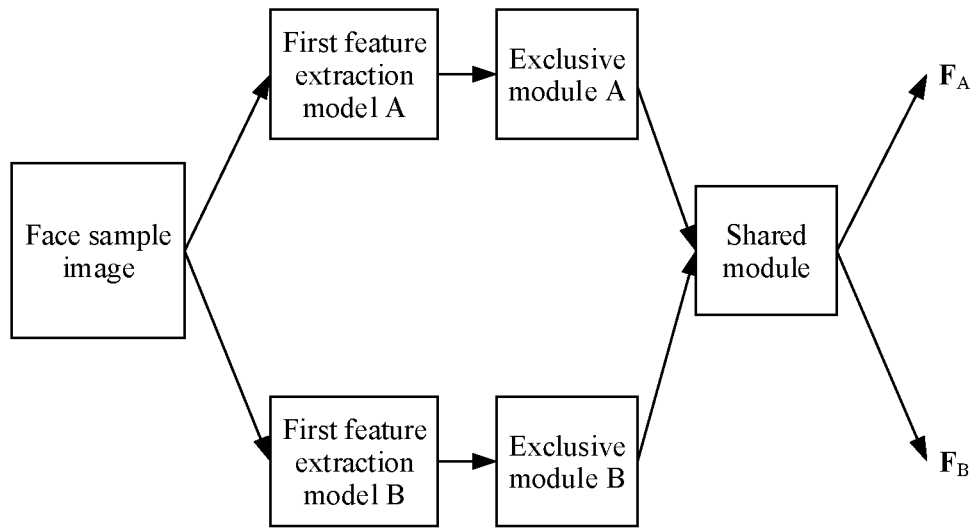
FIG. 9 is a schematic flowchart of a method for training an exclusive module and a shared module according to an embodiment of this application.

For example, the face sample image is input into a plurality of first feature extraction models to output a plurality of first face sample features. The face search device uses both the face sample image and each of the first face sample features as inputs, and an optimization objective is fitting a target feature corresponding to the face sample image. FIG. 9 is a schematic flowchart of a method for training an exclusive module and a shared module according to an embodiment of this application. Refer to FIG. 9. There are two first feature extraction models A and B in a face search device. After first face sample features A and B are obtained from the face sample image by using the two first feature extraction models A and B, a third face sample feature is output by using an exclusive module A of the second feature mapping model A and an exclusive module B of the second mapping model B. Meanwhile, the original face sample image is used as an input to exclusive modules of second feature mapping models A and B. Finally, standard features $F_A$ and $F_B$ are respectively output by using shared modules of mapping models A and B. A training and optimization objective is enabling the standard features to be as close as possible to the target feature of the face sample image. To be specific, $F_A$ should be as similar as possible to the target feature F, and $F_B$ should be as similar as possible to F. When the objective function converges, the second feature mapping model is trained, and the trained second feature model is the first feature mapping model.

Figure 10:
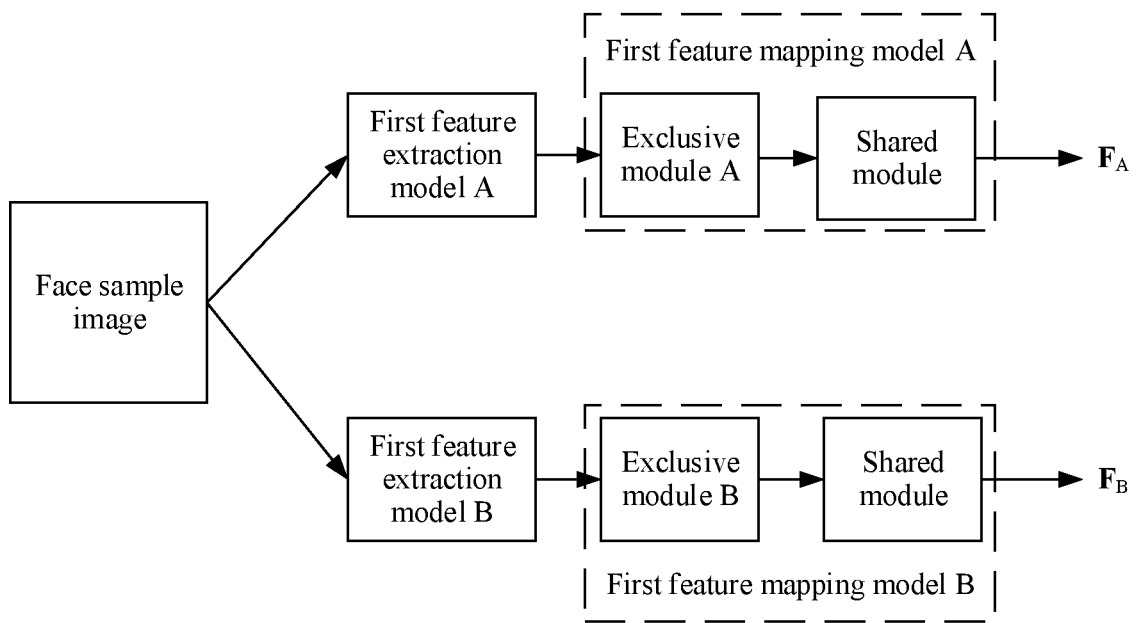
FIG. 10 is a schematic flowchart of a method for performing feature mapping by using a first feature mapping model according to an embodiment of this application.

Further, after all first feature mapping models are jointly trained, FIG. 10 is a schematic flowchart of a method for performing feature mapping by using a first feature mapping model according to an embodiment of this application. Refer to FIG. 10. Each first feature mapping model may be independently used to map different face features to a standard feature for face search.

In some possible implementations, the foregoing second feature mapping model includes an image branching module, a feature branching module, and a synthesis module. The image branching module may be a convolutional neural network, and the feature branching module and the synthesis module may be fully connected neural networks. The fully connected neural network and the convolutional neural network have similar functions, and are different in connection modes of neurons in the networks.

Correspondingly, S603 may include: inputting the face sample image into the image branching module to output a fourth face sample feature; inputting the first face sample feature into the feature branching module to output a fifth face sample feature, where the first face sample feature is extracted from the face sample image by using the first feature extraction model; inputting both the fourth face sample feature and the fifth face sample feature into the synthesis module, to obtain a standard feature corresponding to the first face sample feature; and training the image branching module, the feature branching module, and the synthesis module based on the face sample image, the first face sample feature, the standard feature corresponding to the first face sample feature, and the target feature corresponding to the face sample image, to obtain the first feature mapping model.

Figure 11:
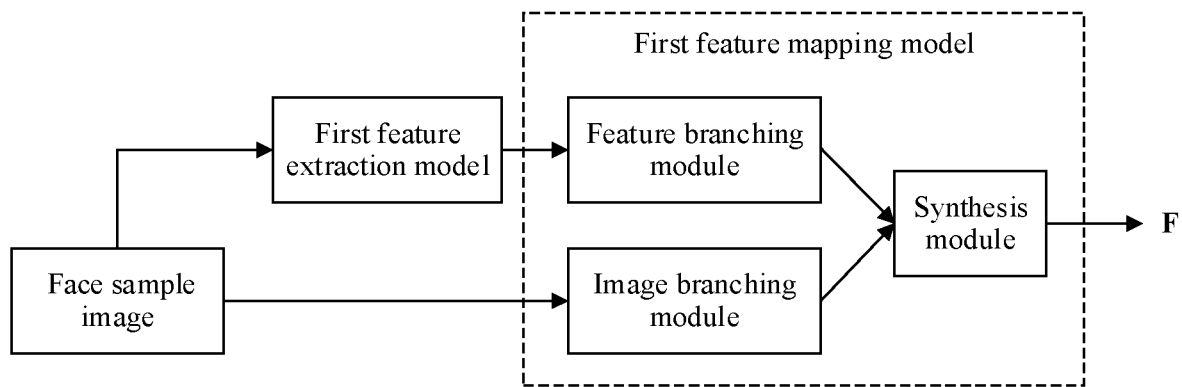
FIG. 11 is a schematic flowchart of a method for training an image branching module, a feature branching module, and a synthesis module according to an embodiment of this application.

For example, the face sample image is input into the first feature extraction model to output a first face sample feature. A face search device uses both the face sample image and the first face sample feature as inputs to the first feature mapping model, and an optimization objective is fitting a target feature corresponding to the face sample image. FIG. 11 is a schematic flowchart of a method for training an image branching module, a feature branching module, and a synthesis module according to an embodiment of this application. Refer to FIG. 11. A first face sample feature is obtained from a face sample image by using a first feature extraction model, a fifth face sample feature is output from the first face sample feature by using the feature branching module, a fourth face sample feature is output from the face sample image by using the image branching module, and both the fourth face sample feature and the fifth face sample feature are input into the synthesis module to output a standard feature. A training and optimization objective is enabling the standard feature to be as close as possible to the target feature of the face sample image. When the objective function converges, the second feature mapping model is trained, and the trained second feature model is the first feature mapping model. Further, after all first feature mapping model is trained, each first feature mapping model may be used to map a face feature obtained by using a corresponding first feature extraction model to a standard feature for face search.

It should be understood that, in this implementation, the target feature used when the second feature mapping model is trained may be obtained by only a manufacturer, or may be obtained through cooperation between the manufacturer and another manufacturer.

It can be learned from the foregoing that, in this embodiment of this application, a face feature and a face image are both used as inputs to a feature mapping model. When it is difficult to obtain an appropriate standard feature by using only the face feature, a more appropriate standard feature is obtained by using additional information provided by the face image. This improves face search accuracy. In addition, features extracted by using a plurality of feature extraction models are concatenated, and a concatenated feature is used as a basis for constructing a standard feature. In this case, a face search device can select an appropriate feature space by comprehensively applying the plurality of feature extraction models. This improves face search accuracy. Further, because a standard feature needs to be obtained from each face image by using only one feature extraction model and one feature mapping model, a calculation amount of a system does not exponentially increase with a quantity of models. This reduces a calculation amount of the system. Further, feature mapping models one-to-one correspond to feature extraction models, and a quantity of feature mapping models is consistent with a quantity of feature extraction models. Therefore, the face search device does not need to train a large quantity of feature mapping models. This reduces a calculation amount of the system.

Figure 12:
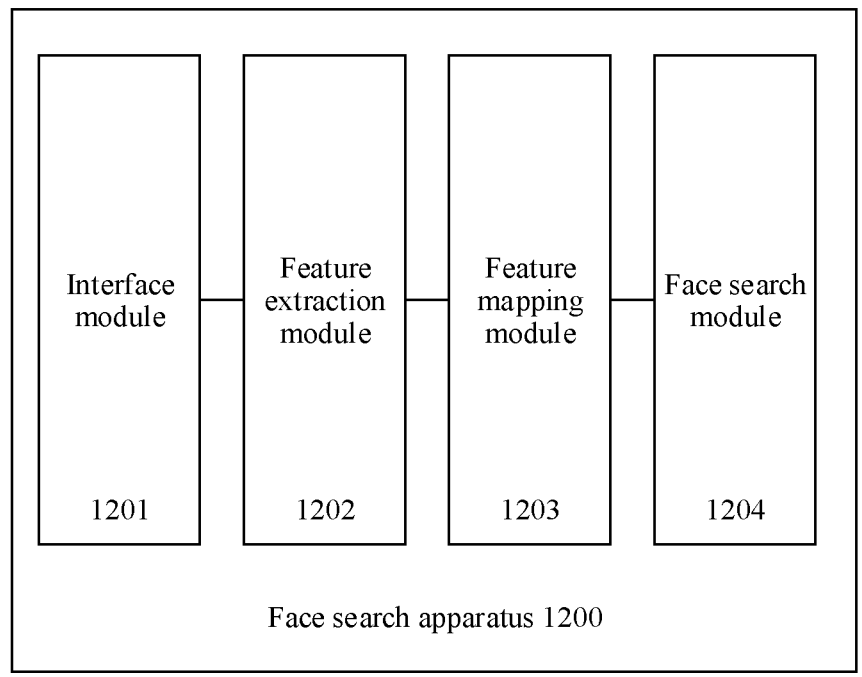
FIG. 12 is a schematic diagram of a structure of a face search apparatus according to an embodiment of this application.

Based on a same inventive idea as the foregoing method, an embodiment of this application provides a face search apparatus. The face search apparatus may be a face search apparatus in the face search device in the foregoing embodiments or a chip or a system on chip in the face search apparatus, or may be a functional module that is in the face search device and that is configured to implement the methods in the foregoing embodiments. The face search apparatus may implement functions performed by the face search device in the foregoing embodiments. The functions may be implemented by hardware executing corresponding software. The hardware or the software includes one or more modules corresponding to the functions. For example, in a possible implementation, FIG. 12 is a schematic diagram of a structure of a face search apparatus according to an embodiment of this application. Refer to FIG. 12. The face search apparatus 1200 includes: an interface module 1201, configured to obtain a to-be-searched face image; a feature extraction module 1202, configured to input the face image into a first feature extraction model to obtain a face feature; a feature mapping module 1203, configured to input the face image and the face feature into a first feature mapping model to output a standard feature corresponding to the face feature, where a feature output dimension quantity of the first feature extraction model is the same as a feature input dimension quantity of the first feature mapping model, and the first feature mapping model is obtained through training based on a target feature corresponding to the face image; and a face search module 1204, configured to perform face search for the face image based on the standard feature.

In some possible implementations, the apparatus further includes: a mapping model training module, configured to: obtain the face sample image; input the face sample image into the first feature extraction model to output a first face sample feature; and train a second feature mapping model based on the face sample image, the first face sample feature, and the target feature corresponding to the face sample image, to obtain the first feature mapping model, where the second feature mapping models one-to-one correspond to the first feature extraction models.

In some possible implementations, the apparatus further includes: a target feature obtaining module, configured to: before the mapping model training module obtains the first feature mapping model that meets an objective function, obtain the face sample image; input the face sample image into N second feature extraction models to output N second face sample features, where N is a positive integer greater than or equal to 2; multiply the N second face sample features by N preset coefficients in one-to-one correspondence; concatenate N second face sample features obtained through multiplication, to obtain a concatenated face sample feature; and obtain, based on the concatenated face sample feature, a target feature corresponding to the face sample image.

In some possible implementations, the target feature obtaining module is further configured to: obtain the face sample image, where the face sample image includes identity information; input the face sample image into the N second feature extraction models to output the N second face sample features; and perform face recognition on the face sample image based on the N second face sample features and the identity information, to obtain the N preset coefficients.

In some possible implementations, the target feature obtaining module is specifically configured to: configure the N preset coefficients for the N second feature extraction models, where the N preset coefficients are equal; or configure the N preset coefficients for the N second feature extraction models according to a preset determining criterion.

In some possible implementations, the target feature obtaining module is specifically configured to: obtain, within a preset coefficient range, a coefficient combination corresponding to the N second feature extraction models; multiply the N second face sample features by the corresponding coefficient combination; concatenate N second face sample features obtained through multiplication, to obtain a concatenated face sample feature; and perform face search for the face sample image based on the concatenated face sample feature, to obtain the preset coefficient that is in the coefficient combination and that meets the preset condition.

In some possible implementations, the target feature obtaining module is further configured to: perform dimension reduction on the concatenated face sample feature; and determine a dimension-reduced face sample feature as the target feature corresponding to the face sample image.

In some possible implementations, the second feature mapping model includes an exclusive module and a shared module.

Correspondingly, the mapping model training module is further configured to: input the face sample image and a plurality of first face sample features into the exclusive module to output third face sample features, where the plurality of first face sample features are extracted from the face sample image by using a plurality of different first feature extraction models; input the third face sample features into the shared module to obtain a standard feature corresponding to the plurality of first face sample features; and train the exclusive module and the shared module based on the face sample image, the plurality of first face sample features, the standard feature corresponding to the plurality of first face sample features, and the target feature corresponding to the face sample image, to obtain the first feature mapping model.

It should be further noted that, for specific implementation processes of the interface module 1201, the feature extraction module 1202, the feature mapping module 1203, the face search module 1204, the mapping model training module, and the target feature obtaining module, refer to detailed descriptions of the embodiments in FIG. 4 to FIG. 11. For brevity of the specification, details are not described herein again. In this embodiment of this application, the interface module 1201 may be configured to perform S501 in the foregoing embodiment, the feature extraction module 1202 may be configured to perform S502 in the foregoing embodiment, the feature mapping module 1203 may be configured to perform S503 in the foregoing embodiment, and the face search module 1203 may be configured to perform S504 in the foregoing embodiment.

In this embodiment of this application, the interface module may be a receiving interface, a receiving circuit, a receiver, or the like. The feature extraction module, the feature mapping module, the face search module, the mapping model training module, and the target feature obtaining module may be one or more processors.

Figure 13:
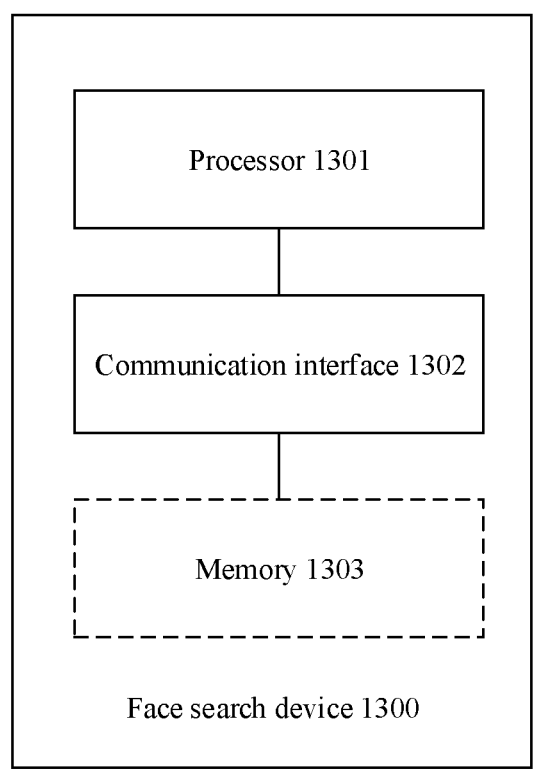
FIG. 13 is a schematic diagram of a structure of a face search device according to an embodiment of this application.

Based on a same inventive idea as the foregoing method, an embodiment of this application provides a face search device. FIG. 13 is a schematic diagram of a structure of a face search device according to an embodiment of this application. Refer to solid lines in FIG. 13, the face search device 1300 may include a processor 1301 and a communication interface 1302. The processor 1301 may be configured to support the face search device 1300 to implement the functions in the foregoing embodiments. For example, the processor 1301 may obtain a to-be-searched face image through the communication interface 1302.

In some possible implementations, refer to a dashed line in FIG. 13, the face search device 1300 may further include a memory 1303. The memory 1303 is configured to store computer-executable instructions and data required for the face search device 1300. When the face search device 1300 runs, the processor 1301 executes the computer-executable instructions stored in the memory 1303, so that the face search device 1300 performs the face search method described in the foregoing embodiments.

Based on a same inventive idea as the foregoing method, an embodiment of this application provides a computer-readable storage medium. The computer-readable storage medium stores instructions. When the instructions are run on a computer, the face search method in the foregoing embodiments is performed.

Based on a same inventive idea as the foregoing method, an embodiment of this application provides a computer program or a computer program product. When the computer program or the computer program product is executed on a computer, the computer is enabled to implement the face search method in the foregoing embodiments.

A person skilled in the art can appreciate that functions described in combination with various illustrative logical blocks, modules, and algorithm steps disclosed and described herein may be implemented by hardware, software, firmware, or any combination thereof. If software is used for implementation, the functions described with reference to the illustrative logical blocks, modules, and steps may be stored in or transmitted over a computer-readable medium as one or more instructions or code and executed by a hardware-based processing unit. The computer-readable medium may include a computer-readable storage medium corresponding to a tangible medium, for example, a data storage medium, or any communication medium that facilitates transmission of a computer program from one place to another (for example, based on a communication protocol). In this manner, the computer-readable medium may generally correspond to: (1) a non-transitory tangible computer-readable storage medium, or (2) a communication medium, for example, a signal or a carrier. The data storage medium may be any available medium that can be accessed by one or more computers or one or more processors to retrieve instructions, code, and/or data structures for implementing the technologies described in this application. A computer program product may include a computer-readable medium.

By way of example and not limitation, some computer-readable storage media may include a RAM, a ROM, an EEPROM, a CD-ROM or another optical disc storage apparatus, a magnetic disk storage apparatus or another magnetic storage apparatus, a flash memory, or any other medium that can store required program code in a form of instructions or a data structure and can be accessed by a computer. In addition, any connection is appropriately referred to as a computer-readable medium. For example, if instructions are transmitted from a website, a server, or another remote source through a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in a definition of the medium. However, it should be understood that the computer-readable storage medium and the data storage medium may not include a connection, a carrier, a signal, or another transitory medium, but actually mean non-transitory tangible storage media. Disks and optical discs used in this specification include a compact disc (CD), a laser disc, an optical disc, a digital versatile disc (DVD), and a Blu-ray disc. The disks generally magnetically reproduce data, whereas the optical discs optically reproduce data with lasers. Combinations of the foregoing objects should also be included in the scope of the computer-readable medium.

Instructions may be executed by one or more processors such as one or more digital signal processors (DSP), a general-purpose microprocessor, an application-specific integrated circuit (ASIC), a field programmable gate array (FPGA), or an equivalent integrated or discrete logic circuit. Therefore, the term "processor" used in this specification may refer to the foregoing structure, or any other structure suitable for implementation of the technologies described in this specification. In addition, in some aspects, the functions described with reference to the illustrative logical blocks, modules, and steps described in this specification may be provided within dedicated hardware and/or software modules configured for encoding and decoding, or may be incorporated into a concatenated codec. In addition, the technologies may be all implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by using different hardware units. Actually, as described above, the units may be combined into a codec hardware unit in combination with appropriate software and/or firmware, or may be provided by interoperable hardware units (including one or more processors described above).

In the foregoing embodiments, the description of each embodiment has respective focuses. For a part that is not described in detail in an embodiment, refer to related descriptions in other embodiments.

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A face search device, comprising:
a processor;
a communication interface coupled to the processor;
a non-transitory memory storage coupled to the processor and comprising instructions stored therein, which when executed by the processor, cause the face search device to perform operations, the operations comprising:
obtaining a face image to be searched;
performing feature extraction on the face image by using a first feature extraction model, to obtain a first face feature;
inputting the face image and the first face feature into a first feature mapping model to output a standard feature corresponding to the first face feature, wherein the first feature mapping model is obtained through training based on a target feature corresponding to a face sample image, and a feature output dimension quantity of the first feature extraction model is same as a feature input dimension quantity of the first feature mapping model; and
performing face search for the face image based on the standard feature.

2. The face search device according to claim 1, wherein the target feature corresponding to the face sample image is obtained by concatenating a plurality of face sample features, the plurality of face sample features are obtained by performing feature extraction on the face sample image by using a plurality of second feature extraction models, the plurality of second feature extraction models comprise the first feature extraction model, and the plurality of second feature extraction models have different training samples, different model structures, different training policies, or different feature dimension quantities.

3. The face search device according to claim 1, wherein the operations further comprise:
obtaining the face sample image;
inputting the face sample image into the first feature extraction model to output a first face sample feature; and
training a second feature mapping model, based on the face sample image, the first face sample feature, and the target feature corresponding to the face sample image, to obtain the first feature mapping model, wherein the second feature mapping model corresponds to the first feature extraction model.

4. The face search device according to claim 3, wherein before the training the second feature mapping model, based on the face sample image, the first face sample feature, and the target feature corresponding to the face sample image, to obtain the first feature mapping model, the operations further comprise:
inputting the face sample image into N second feature extraction models to output N second face sample features, wherein N is a positive integer greater than or equal to 2;
multiplying the N second face sample features by N preset coefficients in one-to-one correspondence;
concatenating N second face sample features obtained through multiplication to obtain a concatenated face sample feature; and
obtaining, based on the concatenated face sample feature, a target feature corresponding to the face sample image, wherein a dimension quantity of the target feature is less than or equal to a sum of dimension quantities of the N second feature extraction models.

5. The face search device according to claim 4, wherein the face sample image comprises identity information, and wherein the operations further comprise:
performing face recognition on the face sample image based on the N second face sample features and the identity information, to obtain the N preset coefficients.

6. The face search device according to claim 4, wherein the operations further comprise:
configuring the N preset coefficients for the N second feature extraction models, wherein the N preset coefficients are equal; or
configuring the N preset coefficients for the N second feature extraction models according to a preset determining criterion.

7. The face search device according to claim 4, wherein the operations further comprise:
obtaining, within a preset coefficient range, a coefficient combination corresponding to the N second feature extraction models;
multiplying the N second face sample features by the corresponding coefficient combination;
concatenating N second face sample features obtained through multiplication to obtain a concatenated face sample feature; and
performing face search for the face sample image based on the concatenated face sample feature to obtain the preset coefficient that is in the coefficient combination and that meets the preset condition.

8. The face search device according to claim 4, wherein the obtaining, based on the concatenated face sample feature, the target feature corresponding to the face sample image comprises:
performing dimension reduction on the concatenated face sample feature; and determining a dimension-reduced face sample feature as the target feature corresponding to the face sample image.

9. The face search device according to claim 3, wherein the second feature mapping model comprises an exclusive module and a shared module, and wherein the training the second feature mapping model based on the face sample image, the first face sample feature, and the target feature corresponding to the face sample image to obtain the first feature mapping model comprises:

inputting the face sample image and a plurality of first face sample features into the exclusive module to output third face sample features, wherein the plurality of first face sample features are extracted from the face sample image by using a plurality of different first feature extraction models;

inputting the third face sample features into the shared module to obtain a standard feature corresponding to the plurality of first face sample features; and training the exclusive module and the shared module based on the face sample image, the plurality of first face sample features, the standard feature corresponding to the plurality of first face sample features, and the target feature corresponding to the face sample image, to obtain the first feature mapping model.

10. The face search device according to claim 3, wherein the second feature mapping model comprises an image branching module, a feature branching module, and a synthesis module, and wherein the training the second feature mapping model based on the face sample image, the first face sample feature, and the target feature corresponding to the face sample image to obtain the first feature mapping model comprises:

inputting the face sample image into the image branching module to output a fourth face sample feature;

inputting the first face sample feature into the feature branching module to output a fifth face sample feature, wherein the first face sample feature is extracted from the face sample image by using the first feature extraction model;

inputting both the fourth face sample feature and the fifth face sample feature into the synthesis module, to obtain a standard feature corresponding to the first face sample feature; and training the image branching module, the feature branching module, and the synthesis module based on the face sample image, the first face sample feature, the standard feature corresponding to the first face sample feature, and the target feature corresponding to the face sample image, to obtain the first feature mapping model.

11. The face search device according to claim 1, wherein the performing face search for the face image based on the standard feature comprises:

determining a similarity between the standard feature and a standard feature of a first face sample image, wherein the first face sample image is any one of a plurality of face sample images; and when the similarity is greater than a first threshold, determining the first face sample image as a search target in the face image.

12. A face search method performed by a face search device, comprising:

obtaining a face image to-be-searched;

performing feature extraction on the face image by using a first feature extraction model, to obtain a first face feature;

inputting the face image and the first face feature into a first feature mapping model to output a standard feature corresponding to the first face feature, wherein the first feature mapping model is obtained through training based on a target feature corresponding to a face sample image, and a feature output dimension quantity of the first feature extraction model is same as a feature input dimension quantity of the first feature mapping model; and performing face search for the face image based on the standard feature.

13. The method according to claim 12, wherein the target feature corresponding to the face sample image is obtained by concatenating a plurality of face sample features, the plurality of face sample features are obtained by performing feature extraction on the face sample image by using a plurality of second feature extraction models, the plurality of second feature extraction models comprise the first feature extraction model, and the plurality of second feature extraction models have different training samples, different model structures, different training policies, or different feature dimension quantities.

14. The method according to claim 12, wherein the method further comprises:

obtaining the face sample image;

inputting the face sample image into the first feature extraction model to output a first face sample feature; and training a second feature mapping model based on the face sample image, the first face sample feature, and the target feature corresponding to the face sample image, to obtain the first feature mapping model, wherein the second feature mapping model corresponds to the first feature extraction model.

15. A non-transitory computer-readable media storing computer instructions for image processing, which when executed by one or more processors, cause the one or more processors to perform operations of:

obtaining a face image to-be-searched;

performing feature extraction on the face image by using a first feature extraction model, to obtain a first face feature;

inputting the face image and the first face feature into a first feature mapping model to output a standard feature corresponding to the first face feature, wherein the first feature mapping model is obtained through training based on a target feature corresponding to a face sample image, and a feature output dimension quantity of the first feature extraction model is same as a feature input dimension quantity of the first feature mapping model; and performing face search for the face image based on the standard feature.

16. The non-transitory computer-readable media of claim 15, wherein the target feature corresponding to the face sample image is obtained by concatenating a plurality of face sample features, the plurality of face sample features are obtained by performing feature extraction on the face sample image by using a plurality of second feature extraction models, the plurality of second feature extraction models comprise the first feature extraction model, and the plurality of second feature extraction models have at least different training samples, different model structures, different training policies, or different feature dimension quantities.

17. The non-transitory computer-readable media of claim 15, wherein the operations further comprise:
- obtaining the face sample image;
- inputting the face sample image into the first feature extraction model to output a first face sample feature; and
- training a second feature mapping model based on the face sample image, the first face sample feature, and the target feature corresponding to the face sample image, to obtain the first feature mapping model, wherein the second feature mapping model corresponds to the first feature extraction model.

* * * * *